United States Patent [19]
Goszyk

[11] Patent Number: 6,153,836
[45] Date of Patent: Nov. 28, 2000

[54] ADJUSTABLE AREA COORDINATE POSITION DATA-CAPTURE SYSTEM

[76] Inventor: Kurt A. Goszyk, 17 Lookout La., Washington Crossing, Pa. 18977

[21] Appl. No.: 09/053,919

[22] Filed: Apr. 2, 1998

Related U.S. Application Data

[60] Provisional application No. 60/042,578, Apr. 2, 1997.

[51] Int. Cl.[7] .................................................. G08C 21/00
[52] U.S. Cl. .................................. 178/19.01; 178/19.03; 178/19.04
[58] Field of Search .................................... 345/173, 175, 345/176, 177, 179; 178/18.01, 18.03, 18.04, 19.01, 19.02, 19.04

[56] References Cited

U.S. PATENT DOCUMENTS

| | | | |
|---|---|---|---|
| 4,688,933 | 8/1987 | Lapeyre | 356/1 |
| 4,758,691 | 7/1988 | DeBruyne | 178/19 |
| 4,814,552 | 3/1989 | Stefik et al. | 178/18.04 |
| 5,248,856 | 9/1993 | Mallicoat | 178/18 |
| 5,502,514 | 3/1996 | Vogeley et al. | 345/179 |
| 5,717,168 | 2/1998 | DeBuisser et al. | 345/176 |

Primary Examiner—Vijay Shankar
Attorney, Agent, or Firm—Duane, Morris & Heckscher LLP

[57] ABSTRACT

Capturing coordinate path data from a stylus moving across a surface of arbitrary size and shape. A first receiver is mountable to the surface, and is for receiving a first light beam from the stylus. A second receiver is also mountable to the surface, and is for receiving a second light beam from the stylus. The stylus either emits a plurality of divergent cones of light comprising the first and second light beams from an internal light source or provides at least one divergent cone of light comprising the light beams by reflection from at least one divergent light source that shines at least one divergent cone of light over the surface. The first light beam has a first angle with respect to a two-dimensional coordinate system defined within the surface, and the second light beam has a second angle with respect to the two-dimensional coordinate system. The first receiver determines the first angle, and the second receiver determines the second angle. A processor determines the position of the stylus given the first and second angles and the locations of the first and second receiver means in the two-dimensional coordinate system.

20 Claims, 9 Drawing Sheets

ADJUSTABLE AREA COORDINATE POSITION DATA-CAPTURE SYSTEM

CROSS-REFERENCES TO RELATED APPLICATIONS

This nonprovisional U.S. national application, filed under 35 U.S.C. § 111(a), claims, under 37 C.F.R. § 1.78(a)(3), the benefit of the filing date of provisional U.S. national application No. 60/042,578, filed on Apr. 2, 1997 under 35 U.S.C. § 111(b), the entirety of which is incorporated herein by reference.

BACKGROUND OF THE INVENTION

1. Field of the Invention

The present invention relates to systems for capturing coordinate path data from a stylus, and, in particular, to systems for capturing X,Y coordinate path data from a moving stylus.

2. Description of the Related Art

Devices such as electronic graphic sketch pads, digitizing tablets, electronic white boards, and copy boards are widely used to capture X,Y coordinate path data from a moving stylus, which is typically manipulated in a path over the X,Y plane by a human user or other stylus manipulator such as a robotic arm. For example, such devices are used for real-time capture of hand-written notes, drawings and sketches, machine tool placement, robotic arm positioning, and sensory feedback for motion training. Such captured data is typically stored in computer memory or provided to a network for mass storage, manipulation, or distribution to participants in a data conference.

Unfortunately, such conventional stylus data capture devices typically require an attached board or fixed frame that serves as a sensing medium and coordinate reference. Further, the board is typically fixed in size at the time of manufacture. The cost of such boards may be comparatively high, and, due to this comparatively high cost, typically provide a maximum useful sensing area of about 6'×4'.

SUMMARY

A system for capturing coordinate path data from a stylus moving across a surface of arbitrary size and shape. A first receiver is mountable to the surface, and is for receiving a first light beam from the stylus. A second receiver is also mountable to the surface, and is for receiving a second light beam from the stylus. The stylus either emits a plurality of divergent cones of light comprising the first and second light beams from an internal light source or provides at least one divergent cone of light comprising the light beams by reflection from at least one divergent light source that shines at least one divergent cone of light over the surface. The first light beam has a first angle with respect to a two-dimensional coordinate system defined within the surface, and the second light beam has a second angle with respect to the two-dimensional coordinate system. The first receiver determines the first angle, and the second receiver determines the second angle. A processor determines the position of the stylus given the first and second angles and the locations of the first and second receiver means in the two-dimensional coordinate system.

DESCRIPTION OF THE PREFERRED EMBODIMENT

There is provided herein a stylus data capture system and associated method for capturing X,Y coordinate path data from a moving stylus. In the case of capturing human handwriting, the stylus will typically resemble a writing instrument such as a pen or pencil. The term "stylus" will be used generally herein to refer to any stylus, writing instrument, holder (e.g., pen holder), cutting tool, or other object or thing the X,Y coordinate path data of which is desired to be captured. The present invention provides for moving stylus data capture but at a lower cost than prior devices and without the need for an attached board and fixed reference frame. The present invention also provides for a user-adjustable sensing field that accommodates drawing (i.e., stylus movement) areas from about 12'9"×12'9" or greater, with high resolution and accuracy.

The present invention can, therefore, turn ordinary surfaces such as chalk boards, dry erasable white boards, desk surfaces, tables, walls, and the like, into an electronic data capture medium or board. The present stylus data capture system can be easily moved from one surface size to another for true portability and cost effective utility. In one embodiment, the entire apparatus can be fit into a single briefcase, and a quick and simple user software calibration procedure can be used to define the new surfaces' perimeter boundaries and scale, so that the device can be easily applied to new surfaces of different sizes and orientations and, in general, to surfaces of arbitrary size and shape. These and other details and advantages of the present invention are described in further detail below.

Figure 1:
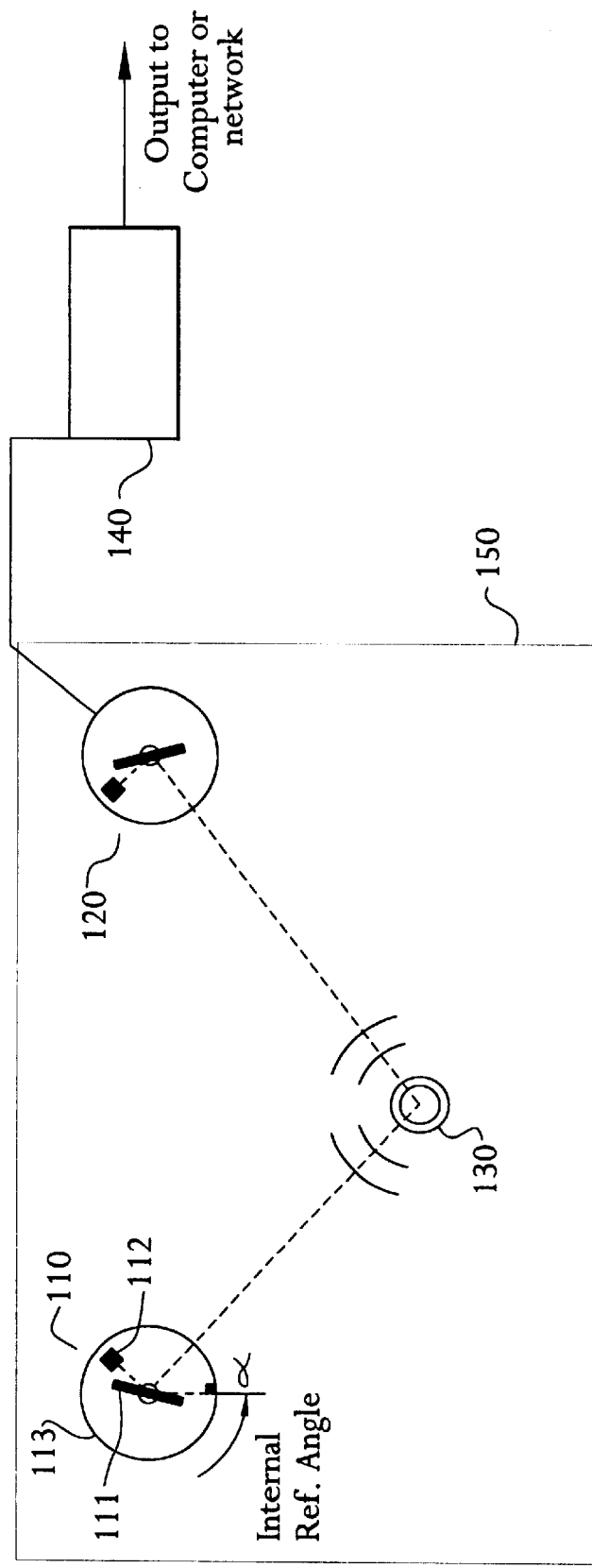
FIG. 1 is a block diagram of stylus data capture system using independent passive rotating scanning receivers (scanners) with an active infra-red (IR) transmitting stylus, in accordance with an embodiment of the present invention.

Referring now to FIG. 1, there is shown a block diagram of stylus data capture system 100, which uses independent passive rotating scanning receivers (scanners) 110, 120 with an active infra-red (IR) transmitting stylus 130, in accordance with an embodiment of the present invention. In this embodiment, a stylus data capture system comprises three main parts: a pair of portable IR scanners 110, 120; IR transmitting stylus or holder 130; and processor 140. In one embodiment, processor 140 is an embedded microprocessor controller (microcontroller) 140, such as an Intel® 8052 processor. Stylus 130 emits a signal that is detectable by scanners 110, 120, and provided to processor 140. Processor 140 then triangulates this sensed or scanned information into rectangular coordinates, so that the real-time or instantaneous path or position data for stylus 130 may be stored or otherwise used, for example by being output to a computer or network (not shown) by processor 140.

Each scanner 110, 120 comprises several components, and is preferably an electromechanical rotating scanner about 4" in diameter and 2" high. Scanner 110, for example, comprises a scanning motor 113, a passive optical sensor such as photo diode 112, a rotating scanning mirror 113, which at any time has an internal reference angle α, and circuitry (not shown) to detect the beam wave front emanating from stylus 130. In one embodiment, analog circuitry in each scanner 110, 120 determines the center of stylus 130 by using a first derivative function, as described in further detail below with reference to FIG. 3.

Scanners 110 and 120 can thus capture the position and motion of IR stylus when it is "active," i.e. transmitting a signal detectable by scanners 110, 120. Processor 140 triangulates the position of the stylus at any moment by comparing the internal reference angles α from each scanner 110, 120, to a reference IR source (not shown) in the scanner housing to calculate the relative position angle.

Stylus 130 preferably has a programmable pulse code modulated (PCM) frequency generator that generates several unique codes. These codes can be interpreted by scanners 110, 120 (or, alternatively, by processor 140) as various stylus characteristics (colors, line width, and so forth), stylus types (chalk, eraser, erasable pen, pencil, and so forth), control functions, and the like (collectively referred to herein, in general, as stylus characteristics). In one embodiment, a plurality of styli are available, each having a separate PCM frequency, corresponding to a different stylus characteristic. In alternative embodiments, a single stylus may have keys or buttons that allow differnet PCM codes to be emitted. In yet another embodiment, a stylus may be a pen holder, which changes its PCM code depending on which pen is inserted therein.

Scanners 110 and 120 are mounted on a surface 150, preferably at the upper corners thereof. Stylus 130 is manipulated, for example by a human user sketching or drawing, over the X,Y coordinate plane defined over surface 150. Thus, as a user moves stylus 130 over surface 150, scanners 110 and 120 and processor 140 detect and triangulate the instantaneous, real-time position and therefore path of stylus 130.

Figure 2:
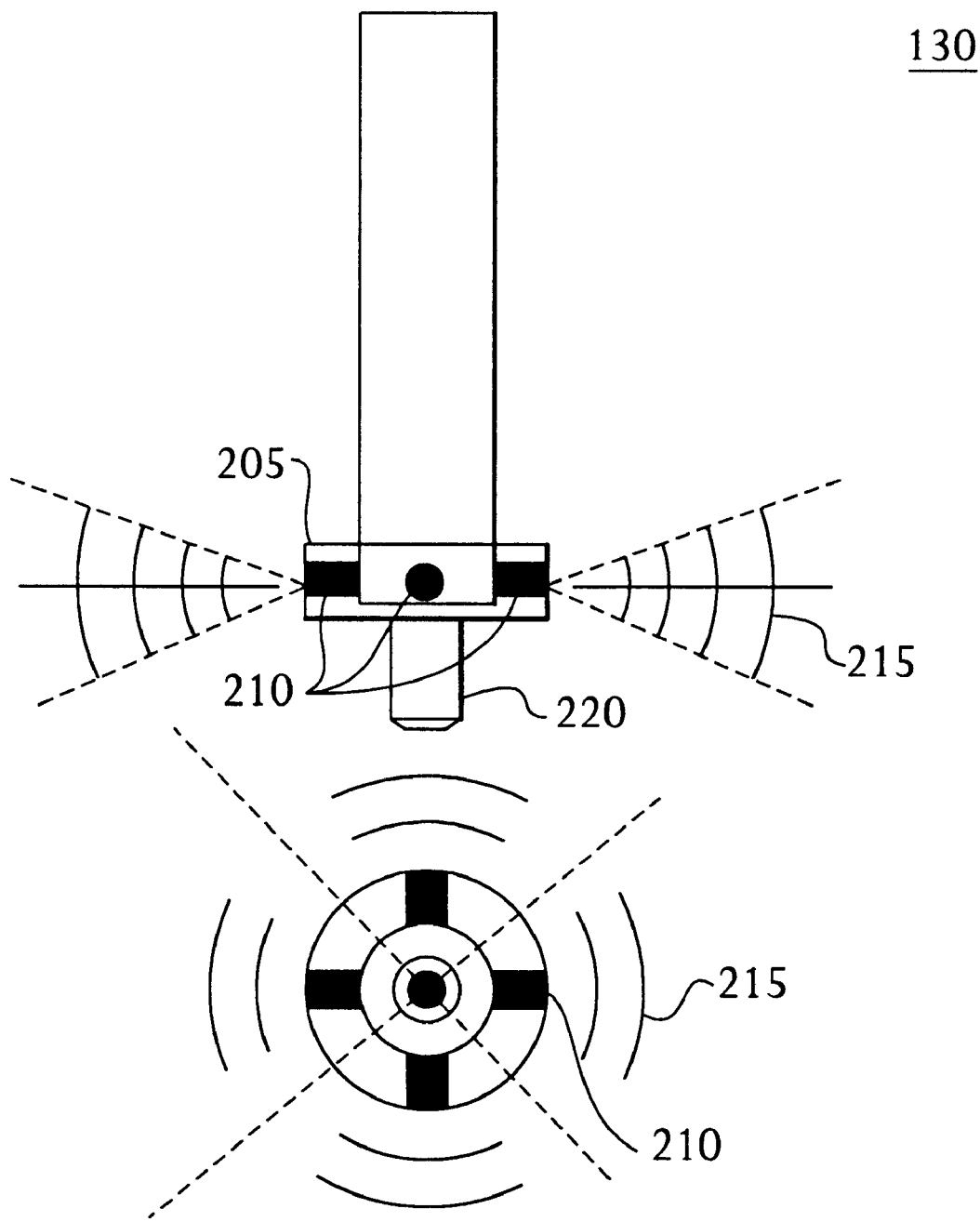
FIG. 2 illustrates side and bottom perspective views of the stylus of FIG. 1 in further detail.

Referring now to FIG. 2, there are shown side and bottom perspective views of stylus 130 of system 100 of FIG. 1 in further detail. IR stylus is preferably battery-powered and activates a group of IR light-emitting diodes (LEDs) 210 placed around the circumference of the base or bottom 205 thereof. Each LED 210 emits or radiates a roughly 90° conical IR light beam 215, so that beams are emitted in all 360° whenever the stylus is activated by a user. The term "light" is used generally herein to refer to electromagnetic radiation such as regular visible light, IR light, laser light, and the like. Those skilled in the art will appreciate that the term "cone" or "conical" as used herein can include light pattern emission shapes other than cones with circular cross-section; for example, a conical IR light beam may have an elliptical cross-section, as the term is used herein.

IR stylus 130 contains a pressure-sensitive tip 220, which activates LEDs 210 whenever enough pressure is applied by the user to depress tip 220 against surface 150. Thus, a user may simply depress stylus 130 to indicate he is drawing or writing, and lift the stylus off of surface 150 to re-position it without writing. By positioning LEDs 210 around the base 205 or tip 220 of stylus 130, the angle or tilt of the axis of the stylus with respect to surface 150 will have a minimum effect on stylus position accuracy. Thus, stylus 130 emits a plurality of divergent cones of light (one from each LED 210, which serve as light sources) over surface 150, which cones of light include the particular light beams that are received by scanners 110, 120.

In an alternative embodiment, stylus 130 does not emit its own radiated light beam, but rather contains a sufficiently mirrored or reflective surface(s) to reflect light or other radiation emitted by one or more separate radiation sources, such as first and second IR or other divergent radiation sources mounted within the housing of each of scanners 1 10 and 120, respectively. For example, a band of reflective tape may be wrapped around the base of a stylus where LEDs 210 are placed on stylus 130. In this alternative embodiment, stylus characteristics may be selected in a variety of ways. For example, the diameter of the stylus may be detected, as described in further detail below with reference to FIG. 11, or different types of reflective surfaces may be utilized, for example having different colors or other reflective properties or different detectable patterns such as bar codes. The divergent light sources generates divergent cones of light which cover the entire drawing surface, and may be comprised of any divergent light source, such as LEDs, (non-collimated) solid state laser diodes, and the like. Because of the divergent cones of light which are reflected off of the reflective surface(s) of the stylus, in this embodiment the stylus also provides (by reflection from the impinging light) at least one divergent cone of light which includes the particular light beams that are received by scanners 110, 120.

For collimated light sources, which are not used in the present invention, rotating mirror scanners effectively "fan" the light out over a broader area than the original beam would cover by sweeping the beam rapidly across due to the action of the rotating mirror. Thus, one advantage of using divergent light sources (either those reflected or emitted from a stylus) is that, unlike collimated light sources which produce a narrow beam of light, divergent light sources do not need to be fanned out by electromechanical devices such as rotating mirror scanners. Additionally, collimated light sources, even when fanned out, are usually fanned out horizontally, so that placement of the receivers becomes critical. For example, either a slightly tilted stylus or receiver can cause the receiver not to successfully receive reflected light rays which originate from a collimated light source. However, because of the relatively wide-angled, cone-shaped light beam emitted by each LED of a stylus or reflected from a divergent light source, receiver placement as well as stylus tilt are not as critical.

In an alternative embodiment, the stylus and data capture system may be modified so that the tilt of stylus 130 may be detected by scanners 110, 120 and processor 140. This detected tilt may then be corrected for to ensure that stylus tilt does not adversely affect position measurement and determination, or may be used for other purposes, for example to alter the width or other stylus drawing characteristics (e.g., a calligraphic stylus could draw different shaped or width lines depending on the tilt of the stylus). This tilt detection may be implemented, for example, by using a reflective stylus having two different bands of reflective tape, each reflecting a separate beam, in a different way (e.g., color). The difference in the beams from the two bands can be processed by processor 140 to determine the tilt of stylus 130, and appropriate action taken based on this determination.

Figure 3:
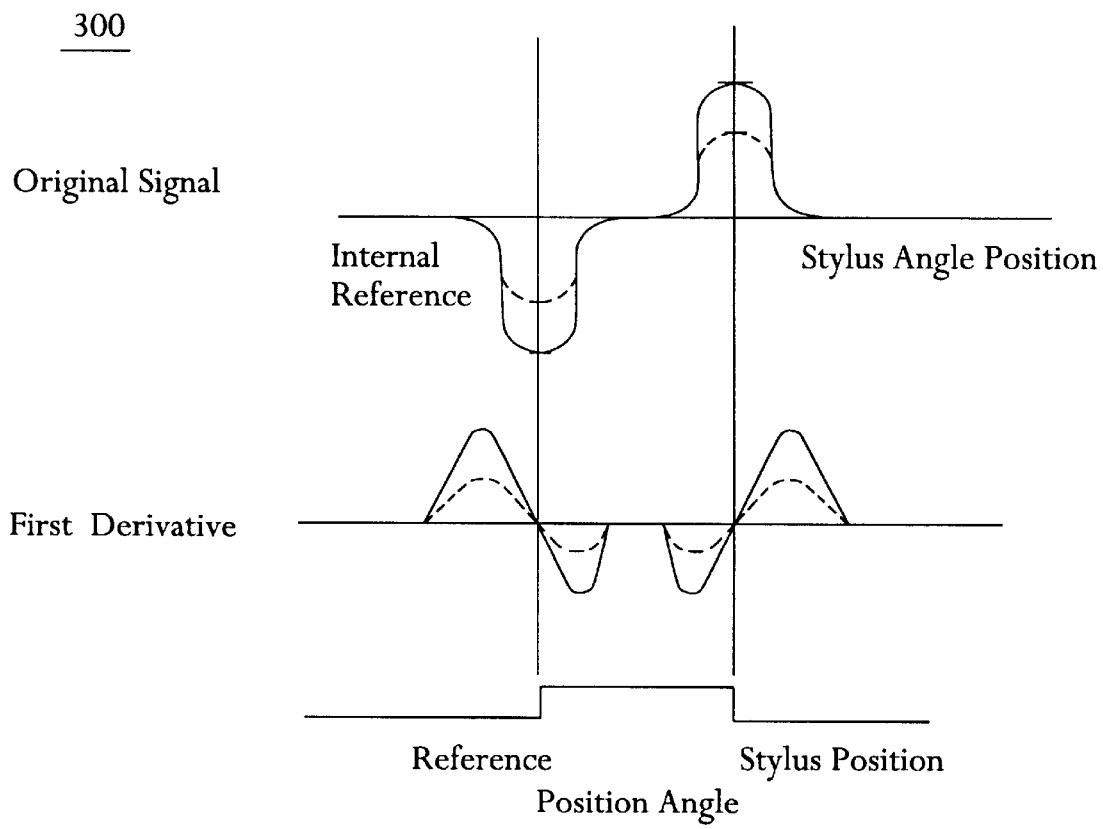
FIG. 3 is a signal diagram illustrating the processing waveforms used by the scanners of the system of FIG. 1.

Referring now to FIG. 3, there is shown a signal diagram 300 illustrating the processing waveforms used by the scanners of the system of FIG. 1. Diagram 300 shows the waveform of the original received signal 310, and the waveform of the first derivative 320 thereof. As described above, in one embodiment, analog circuitry in each scanner 110, 120 determines the center of stylus 130 by using the first derivative function, illustrated by waveform 320. Scanners 110, 120 determine the center of stylus 130 using the first derivative function by sensing the leading and trailing edges of both the internal IR reference signal and the stylus IR signal. Next, the absolute center of each signal is calculated to determine the proper angle position. Using this approach, each scanner 110, 120 ignores light attenuation at different stylus distances from the scanner photo diode. The same is also true for different stylus signal size diameters due to different IR sources or light intensities.

As illustrated in FIG. 3, scanner photo diode 112 sees the original IR signal 310 from the internal reference and from the stylus 130 as they are scanned by the rotating mirror. Analog circuitry constructs the first derivative 120. As will be appreciated, by using the first derivative, scanners 110, 120 detect only rapid changes in light intensity, which prevents steady state ambient light (e.g. from fluorescent lights, from the relatively slow raster beam from a computer cathode-ray tube (CRT), extraneous light, or IR energy) to cause a false signal trigger. Additionally, this implementation is immune to light signal intensity as shown in the first derivative waveform. Thus, even as the amplitude of the original signal 310 diminishes (e.g., due to increased distance from stylus 130 to scanner 110 or 120, as illustrated by dashed signal lines in waveforms 310, 320), the zero crossing function of the first derivative 320 ensures that the positions are constant in time. In alternative embodiments, signal detection techniques and analyses other than the first derivative may also be employed, and digital rather than analog signal detection techniques may also be employed.

To accommodate the large area range covered by the invention, an automatic gain control (AGC) sensor circuit (not shown) is also incorporated into each scanner 110, 120. The AGC circuits in each scanner ensures that the large dynamic IR signal range does not saturate the scanner's input amplifier when stylus 130 is close to the receiver, and that the input signal can be amplified when the stylus is at greater distances from the respective scanner 110 or 120. The AGC function operates as follows. A separate AGC circuit senses the IR amplitude of the stylus signal and increases or decreases the gain of the scanner's photo diode detection amplifier. Inversely proportional to the amplifier gain, the AGC circuit in the present rotating scanner embodiment also controls the brightness of the scanner's internal reference IR LED. Therefore, stylus 130 and the internal reference IR signal amplitudes appear relatively constant to each other. The AGC therefore transforms the large dynamic input signal range into a smaller variation that the first derivative analog circuitry can handle. The first derivative 320 (see FIG. 3) of the original input signal 310 provides a zero crossing signal that is independent of IR signal amplitude. Accurate calculation of the scanner angles α is therefore assured. This gain control is accomplished through the use of a junction field-effect transistor (JFET) amplifier transistor (type 2N5457, for example) in the feedback leg of the scanning photo diode's operational amplifier (op amp), or a variable gain op amp. Proper bias resistors are selected to provide sufficient dynamic range for the JFET or variable gain op amp to control the signal to the first derivative amplifiers within an acceptable tolerance.

Each scanner's analog circuitry also preferably contains a band pass input filter that discriminates a PCM signal received from stylus 130. This band pass filter passes only the variable pulses to a counting circuit. Depending upon the number of counts in a fixed time, the embedded microprocessor interprets these codes into meaningful data, such as the stylus characteristic, type, and the like described above.

Figure 4:
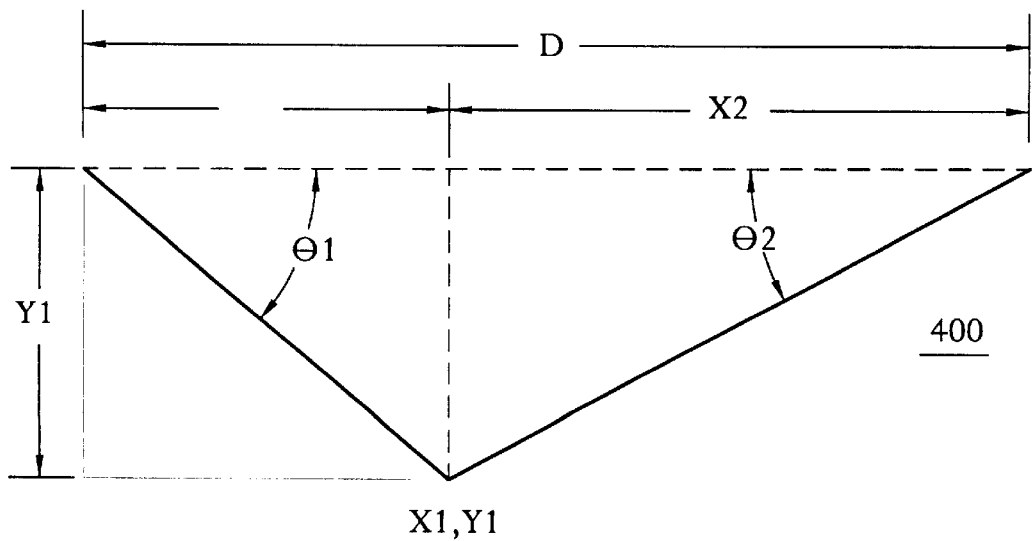
FIG. 4 is a trigonometric representation of the two-dimensional (2D) sensing plane used by the processor of the system of FIG. 1 in a software calibration algorithm to triangulate the stylus's position on a surface into X,Y coordinates.

As will further be appreciated, knowledge by a scanner 110 or 120 of angular position relative to the respective scanner 110 or 120 is not sufficient to allow processor 140 to triangulate the stylus's position on a surface into X,Y coordinates. Thus, each scanner 110, 120 must also track to a common reference. This is accomplished through a software calibration algorithm, as described in further detail with respect to FIG. 4. Referring now to FIG. 4, there is illustrated a trigonometric representation 400 of the two-dimensional (2D) sensing plane used by processor 140 in a software calibration algorithm to triangulate the position of stylus 130 on surface 140 into X,Y coordinates corresponding to locations of stylus 130 with respect to surface 150.

In implementing the software calibration algorithm, each of scanners 110, 120 is positioned approximately at the upper corners of surface 150. Suction cups or other locking or securing means are used to secure scanners 110, 120 to surface 150. Each scanner 110, 120 has a hole provided at the rotational center thereof, of sufficient size to receive stylus 130. Next, stylus 130 is placed in the hole of the first scanner, scanner 110, and processor 140 determines the angular position of scanner 110 relative to the second scanner's internal reference beam. This is offset angle $\theta_{2\mathit{off}}$. Next, stylus 130 is placed in the hole of the second scanner, scanner 120, and processor 140 determines the angular position of scanner 120 relative to the first scanner's internal reference beam. This is offset angle $\theta_{1\mathit{off}}$. At this point, processor 140 now knows the offsets of the scanners 110, 120 to each other, and each scanner's offset relative to its own internal IR reference. Processor 110 then uses these offsets to calculate the angles of the two right triangles formed by the two scanners 110, 120 and stylus 130, as illustrated in trigonometric representation 400 of FIG. 4.

Using standard trigonometry, the solution for X1 and Y1 (which is the current position of stylus 130 in the X,Y coordinate plane) is found by processor 140 by solving the common altitude leg Y1 from the tangent of the two angels as follows:

$$\tan\theta 1 = Y1/X1;\ \tan\theta 2 = Y1/X2;\ X1 = Y1/\tan\theta 1;\ X2 = Y1/\tan\theta 2;$$
$$D = X1 + X2;\ X1 = D/[1 + (\tan\theta 1/\tan\theta 2)] \quad (Eq.\ 1)$$

$$Y1 = X1\tan\theta 1 \quad (Eq.\ 2)$$

From Eqs. 1 and 2, processor 140 can calculate the X,Y coordinates from the scanner angle information.

Figure 5:
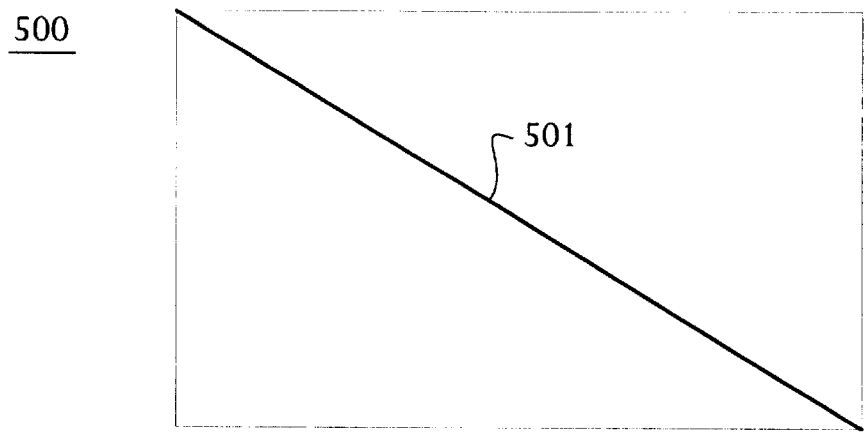
FIG. 5 illustrates a user-defined virtual field or drawing box defined by virtue of drawing a diagonal line with the stylus of the system of FIG. 1.

In addition to the offset angles $\theta_{1off}$, $\theta_{2off}$, which are used to properly align the two independent scanning receivers, in one embodiment an additional set of offset angles is recognized by processor 140 to provide a smaller virtual field within the physical sensing field determined by the locations of scanners 110, 120. Referring now to FIG. 5, there is shown a user-defined virtual field or drawing box 500 defined by virtue of drawing a diagonal line 501 with stylus 130 of system 100 of FIG. 1. The user determines this virtual field 500 according to the boundaries of his or her area of interest, within surface 150's boundaries. The user initiates this function through a switch or double click of the stylus against the drawing surface. Embedded software in processor 140 recognizes this signal and waits for the user to draw a diagonal line representing the boundaries of the desired drawing box, as illustrated by box 500 of FIG. 5.

In defining virtual field 500, the user positions stylus 130 at the upper left hand corner of the desired virtual field or drawing box 500, and moves the stylus toward the bottom right hand corner. A double click of stylus 130 terminates the calibration. The dotted lined box in FIG. 5 represents the active drawing area. This might correspond, for example, to the size of a piece of paper, chalk board, or desk top.

In alternative embodiments of the above-described invention, receiving sensor systems other than an electro-mechanical rotating scanner system such as that described with respect to FIG. 1. For example, in one alternative embodiment, instead of an electro-mechanical rotating scanner system, solid state receiving sensors based upon solid state incident angle detectors (IAD) are used in place of scanners 110, 120. In this embodiment, two solid state IADs are used to triangulate the position of transmitted or reflected radiation (visible or IR light or laser) from a stylus such as stylus 130.

This embodiment may be more desirable, depending on the context and other factors, than use of an electro-mechanical scanner system described previously. For example, a solid state system may be more durable, faster, cheaper, and smaller than an electro-mechanical scanner system. Further, in capturing fast hand motion during writing or illustration, the IADs' speed may provide an advantage over performance of an electromechanical scanner system as illustrated in system 100 of FIG. 1. This advantage arises because current IADs can capture motion in 1/10,000 of a second, compared to 1/120 of a second in the electro-mechanical scanner embodiment. Additionally, IADs have a smaller size than scanners 110, 120, which allows the two angle measurements to be combined into one housing or package located at the corner of a writing surface instead of two packages, one at each top corner of a writing surface. Also, unlike the scanner system 100 of FIG. 1, which employs a reference IR source in each scanner housing to calculate the relative position angle, there is no need to employ such a reference IR source in the IAD embodiment, since there is a known, fixed distance between the two IADs 809, 839, since they are in a common housing. Other advantages and details of operation of the IAD embodiment of the present invention are described below, including the IAD sensing functions and the corresponding coordinate angle measurement technique.

As will be appreciated, IADs provide a solid state sensing function. An IAD consists of two adjacent photo diode elements that provide continuous angle data based upon the ratio of light falling on the two elements' photosensitive surfaces. Each element consists of a P-layer and an N-layer separated by an insulator. When a light spot falls on the P-layer surface of the IAD, an electric charge proportional to the light energy is generated at the incident position. This charge is driven through the top P-layer of the device and collected by an electrode at the end of an IAD. By measuring the photocurrent collected by each element, the ratio of photocurrents is proportional to the angle of the light source relative to the IAD. The formula representing the ratio of the electrode currents is described in Eq. (3):

$$(I_2-I_1)/(I_2+I_1)=m\theta, \qquad (3)$$

where $I_1$ is the current at the first element's photo diode electrode (photo diode electrode 1), $I_2$ is the current at electrode 2, m=the slope of the current ratio, and $\theta$ is incident angle of light falling on both photo diode elements. Because it is a ratio, the angle can be found irrespective of the energy of the incident light.

Figure 6:
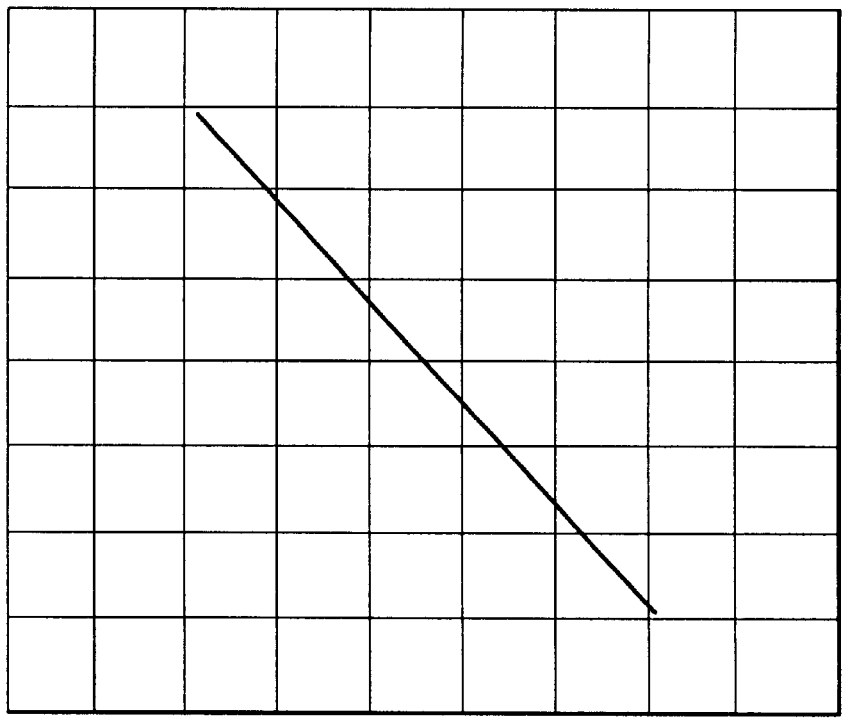
FIG. 6 is a graph illustrating the slope of the relative photo currents versus incident angle θ for a stylus data capture system using solid state receiving sensors based upon solid state incident angle detectors (IAD), in accordance with an alternative embodiment of the present invention.

Referring now to FIG. 6, there is shown a graph 600 illustrating the slope of the relative photo currents versus incident angle $\theta$. By expanding Eq. 3 further, Eq. 4 is obtained:

$$\theta=(I_2-I_1)/m(I_2+I_1) \qquad (4)$$

Figure 7:
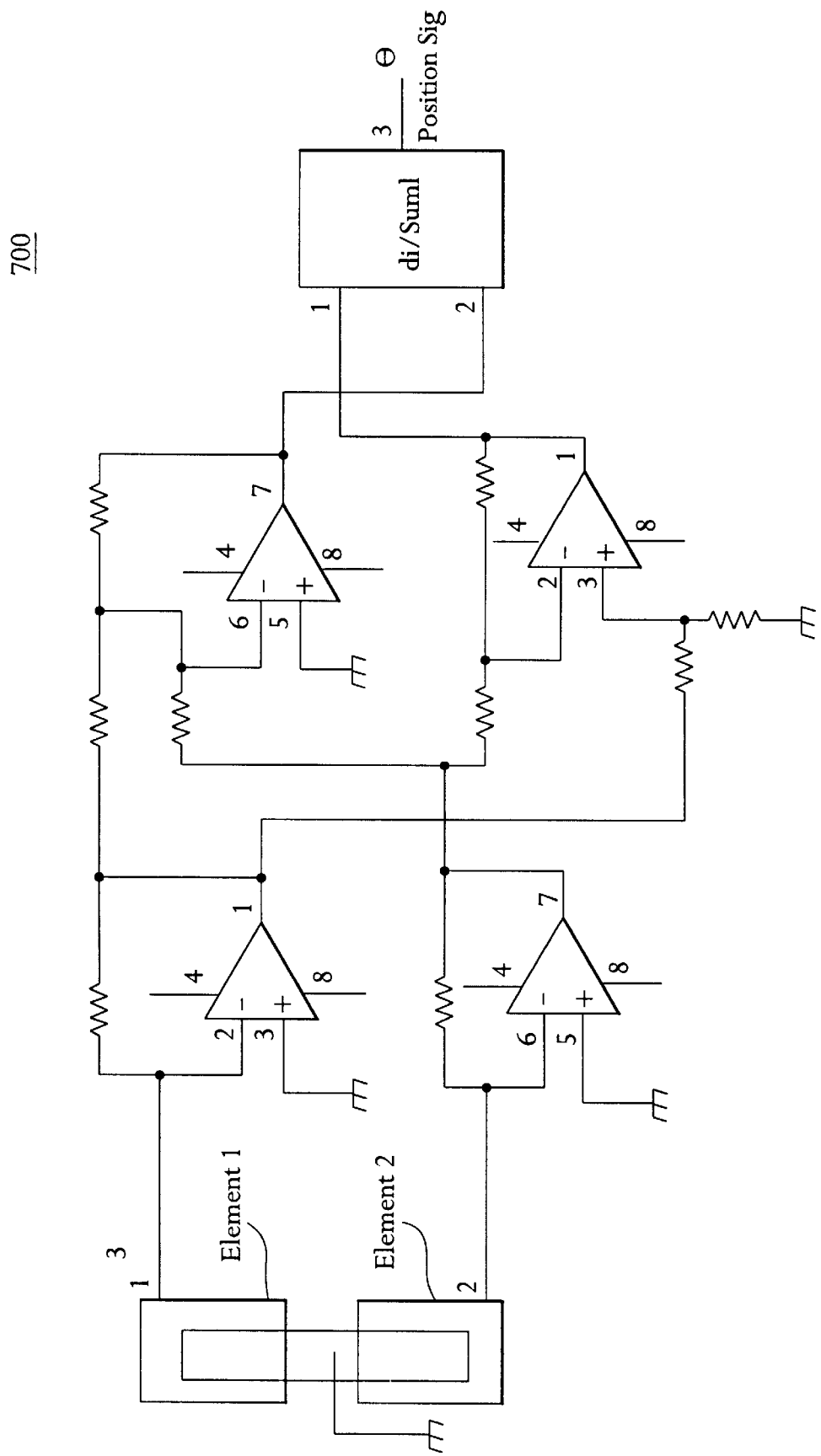
FIG. 7 is a schematic diagram of an operating circuit implementing an equation for determining the incident angle θ of light falling upon the two elements of an IAD of the alternative embodiment of FIG. 6.

Eq. 4 is an equation for determining the incident angle $\theta$ of light falling upon the two elements of an IAD of the alternative, IAD embodiment described above with respect to FIG. 6. Referring now to FIG. 7, there is shown a schematic diagram of an operating circuit 700 which implements Eq. 4. Circuit 700 comprises IAD elements 1 and 2, which provide outputs proportional to $I_1$ and $I_2$, respectively, and op amps and resistive networks sufficient to provide an output $\theta$ in accordance with Eq. (4).

In the IAD embodiment of the present invention, a stylus such as stylus 130 either emits or reflects radiation. In the former case, the stylus contains signal or beam emitters, such as LEDs described above. In the latter case, the stylus contains reflective means such as mirrors or mirrored surfaces which reflect a beam such as a later beam emitted from an external source, such as from a single laser source mounted in the IAD housing.

In the IAD embodiment, two one dimensional IADs are utilized. Each IAD is capable of measuring the angle of a beam ray as it reflects off of or is emitted by an object, such as a stylus. Therefore, by using two IADs placed side by side with a known distance between them, the resulting sensor system can determine, through appropriate triangulation, the coordinate position of an object in two dimensional space.

Figure 8:
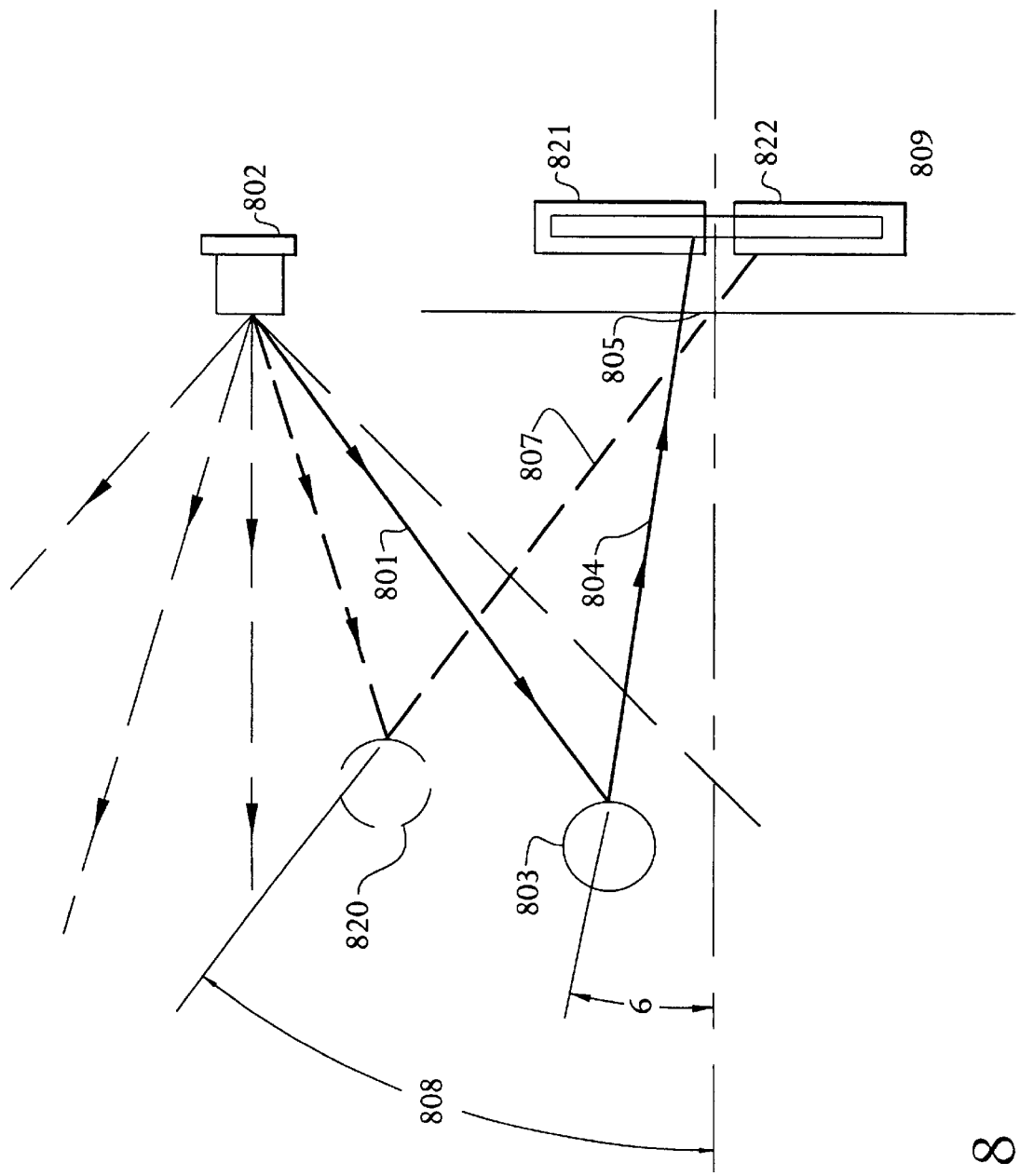
FIG. 8 is a block diagram of a stylus data capture system and an IAD configured as an angle sensor, in accordance with the alternative embodiment of the present invention of FIGS. 6 and 7.

Referring now to FIG. 8, there is shown a block diagram of a stylus data capture system 800 and an IAD 809 configured as an angle sensor, in accordance with the alternative embodiment of the present invention of FIGS. 6 and 7. As an incident light ray 801 from a divergent cone of light produced by an IR LED (or laser source) 802 reflects off of an object such as stylus 803, the reflected ray 804 enters the IAD 809 through a spatial filter 805, or aperture, at a unique angle 806. If stylus 803 moves to a different position 820, a new reflected ray 807 enters spatial filter 805 at a new angle 808. It is noted that, as described above, because of the divergent cone of light which is reflected off of the reflective surface(s) of the stylus, the stylus provides (by reflection) a divergent cone of light which includes the particular light beams that are received by IADs 809, 839. Thus, as noted above, because of the relatively wide-angled, cone-shaped light beam reflected by the stylus, the placement of the IAD pair housing is not critical, and the chance of successfully receiving the light reflected by the stylus is increased.

Depending upon the angle of entry, the reflected rays strike IAD 809's two photo elements 821 and 822 with different intensities. Spatial filter 805 limits the number of reflected rays in order to define a discrete spot on the elements' sensitive area. In alternative embodiments, a lens may also be used between spatial filter 805 and IAD 809 to concentrate more of the IR light for increased sensitivity. For small light to detector distances, no aperture or lens may be required. By processing the light spot ratio on the two elements 821, 822 of IAD 809, a processor such as embedded processor 140 of FIG. 1 can calculate the stylus's angle relative to the IAD's orientation.

Figure 9:
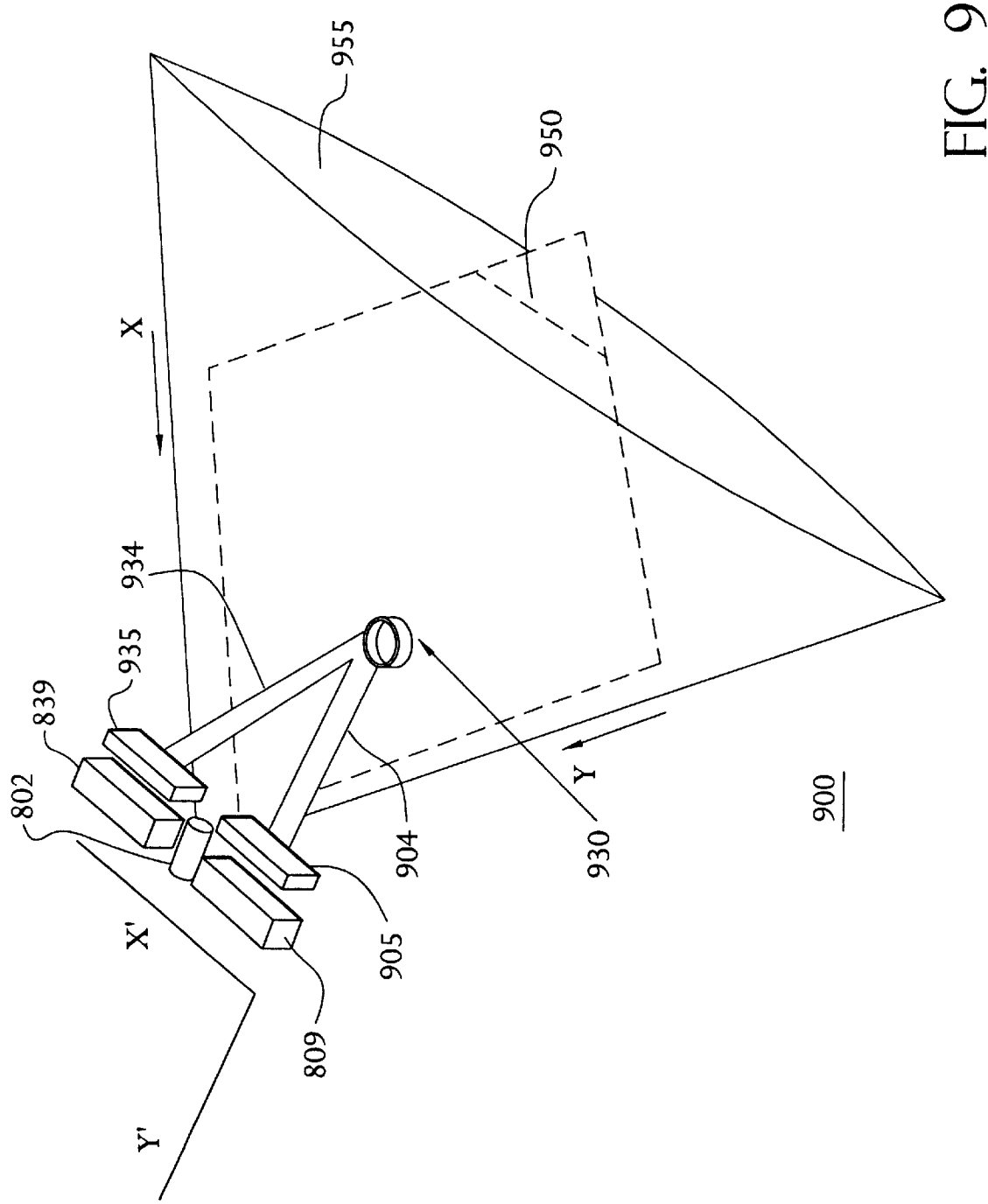
FIG. 9 is a perspective view illustrating the data capture system of FIG. 8 in further detail.

Referring now to FIG. 9, there is illustrated in further detail a perspective view of data capture system 800 of FIG. 8. System 800 comprises two similarly-configured IADs, IAD 809 of FIG. 8 as well as second IAD 839, which have spatial filters 905, 935, respectively. A moving stylus 930 transmits reflected rays 904 and 934 to IADs 809 and 839, respectively. An imaginary X,Y plane 950 is defined with respect to a corresponding surface to which IADs 809 and 839 are mounted. An IR light cone is emitted by IR source 802, which provides rays to be reflected from stylus 930 as reflected rays 904, 934, which form a triangle. Cone 802 is provided by a fixed beam from source 802 defracting through a conventional aspheric or convex lens.

In operation, one or more IR LED (or laser light) sources 802 illuminate the writing area in the form of a light cone 955. (In alternative embodiments, stylus 930 emanates light, like stylus 130 of FIG. 1, rather than reflecting it.) A moving stylus 930 reflects incident IR rays from the IR LED source 802 through each spatial filter 905, 935 to its respective IAD angle sensor of IADs 809, 839. A processor such as previously described uses the triangle formed by stylus 930 and angle sensors or IADs 809 and 839 to calculate an x and y intercept, referred to herein as X' and Y', along the axis of the two IAD sensors.

If stylus 930 comprises LEDs to emit light, stylus 930 may contain a pressure-sensitive tip to activates the LEDs whenever enough pressure is applied by the user to depress the tip against the surface, as described above with respect to stylus 130 of system 100. However, for a reflecting stylus, a differently-configured pressure-sensitive tip may be employed to "deactivate" the stylus. For example, stylus 930 may contain a small radio transmitter that emits a detectable "on" or "off" signal in accordance with whether the tip is depressed or not. Alternatively, to avoid having to put electronics and a battery in stylus 930, the stylus may have a movable sheath, actuated along with tip movement, built into the housing that exposes the reflective surface whenever the tip is depressed and that covers the reflective surface whenever the tip is not depressed, thus stopping the reflected light beam from being reflected to the receivers.

Figure 10:
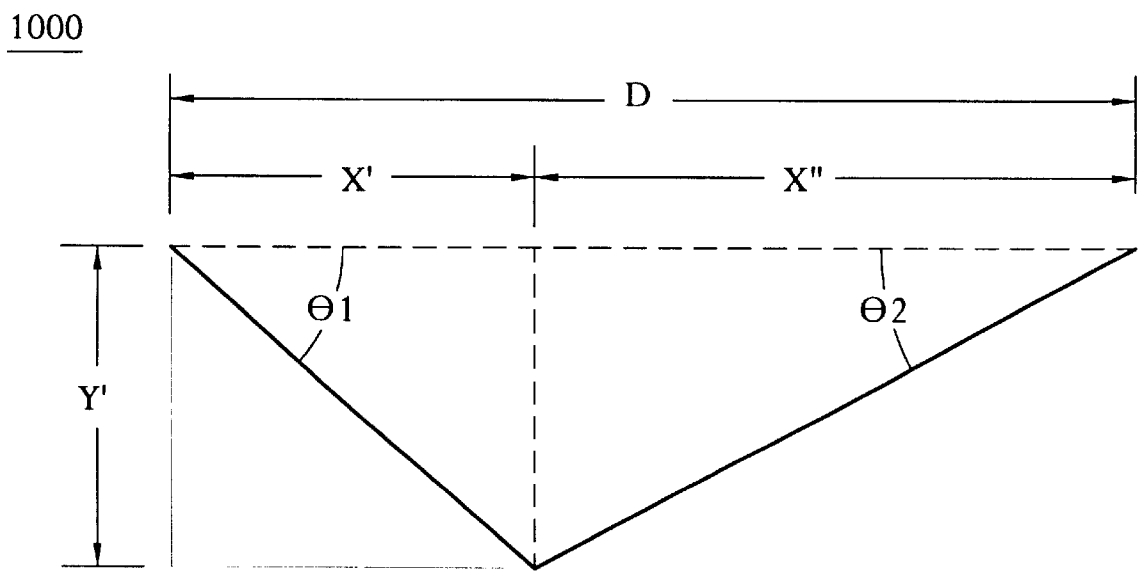
FIG. 10 is a trigonometric representation of the 2D sensing plane used by the processor of the data capture system of FIGS. 8 and 9 to triangulate the stylus's position on a surface into X,Y coordinates.

Referring now to FIG. 10, there is shown a trigonometric representation 1000 of the 2D sensing plane used by the processor of the data capture system of FIGS. 8 and 9 to triangulate the stylus's position on a surface into X,Y coordinates. Using trigonometry, as illustrated in FIG. 10, the solution for X' and Y' can be derived by solving the common altitude leg Y' from the tangent of the two angles as follows:

$$\tan\theta 1 = Y'/X'; \tan\theta 2 = Y'/X''; X' = Y'/\tan\theta 1, X'' = Y'/\tan\theta 2; D = X' + X'',$$

where D is the separation distance between the two IAD sensors 809 and 839. From these relationships, the value of Y' is determined as shown in Eq. (5):

$$Y' = X'\tan\theta 1 \quad (5)$$

The value for X' is shown in Eq. (6):

$$X' = D/[1 + (\tan\theta 1/\tan\theta 2)]. \quad (6)$$

Because the two angle sensors (IADs 809, 839) form a leg of the triangle normal to the diagonal of 2D plane 950, an additional 45 degree angle correction must be made to normalize X' and Y' relative to X and Y of the plane of interest. This normalization is accomplished with the following Eqs. (7) and (8):

$$X = 0.707(Y' + X'); \quad (7)$$

$$Y = 0.707(Y' - X'). \quad (8)$$

From equations 5, 6, 7, and 8 we can determine the rectangular X and Y coordinates of stylus 930 in 2D plane 950 from the angular position information conveyed by the IADs 809, 839.

In the IAD embodiment described above, a passive reflecting IR stylus or other device such as pen holder is preferably utilized instead of an active transmitting type such as stylus 130 of system 100. As described, the light or radiation source may be of any sufficient type, such as IR from an LED or laser light, from a source located within the IAD sensor package which contains IADs 809, 839. One advantage to using such a passive stylus is that it does not require a power source (e.g., batteries) to emit a light beam. Instead, the light source derives its power from the power supply located in the same package as are the IAD receivers.

As described above with respect to system 100 of FIG. 1, stylus 130 preferably has a programmable PCM frequency generator that generates several unique codes. These codes can be interpreted by scanners 110, 120 (or, alternatively, by processor 140) as various stylus characteristics (colors, line width, and so forth), stylus types (chalk, eraser, erasable pen, pencil, and so forth), control functions, and the like.

In the alternative IAD embodiment described above, this feature is provided by configuring the IAD system to determine various stylus characteristics or other codes by determining the diameter of the stylus used. For example, a user can use a larger diameter stylus 930 when a thicker line is to be drawn. Alternatively, different colors are painted on different styli to represent the color to be drawn, and each color stylus has a unique diameter corresponding thereto. In this case, system 800 is configured with means to determine the stylus diameter. The embedded processor can then determine which stylus characteristic corresponds thereto, for example by use of a look-up table (LUT).

In one embodiment, this means for determining the diameter of the stylus is provided by use of a low-resolution (256 pixels), low-cost, charge coupled device (CCD) mounted above the focal point of light source 802, and between IAD sensors 809 and 839, also receives reflected light. The CCD sensor and the embedded processor located in the source structure differentiates among stylus diameters (and thus characteristics) by counting the number of illuminated pixels in the reflected beam width.

Figure 11:
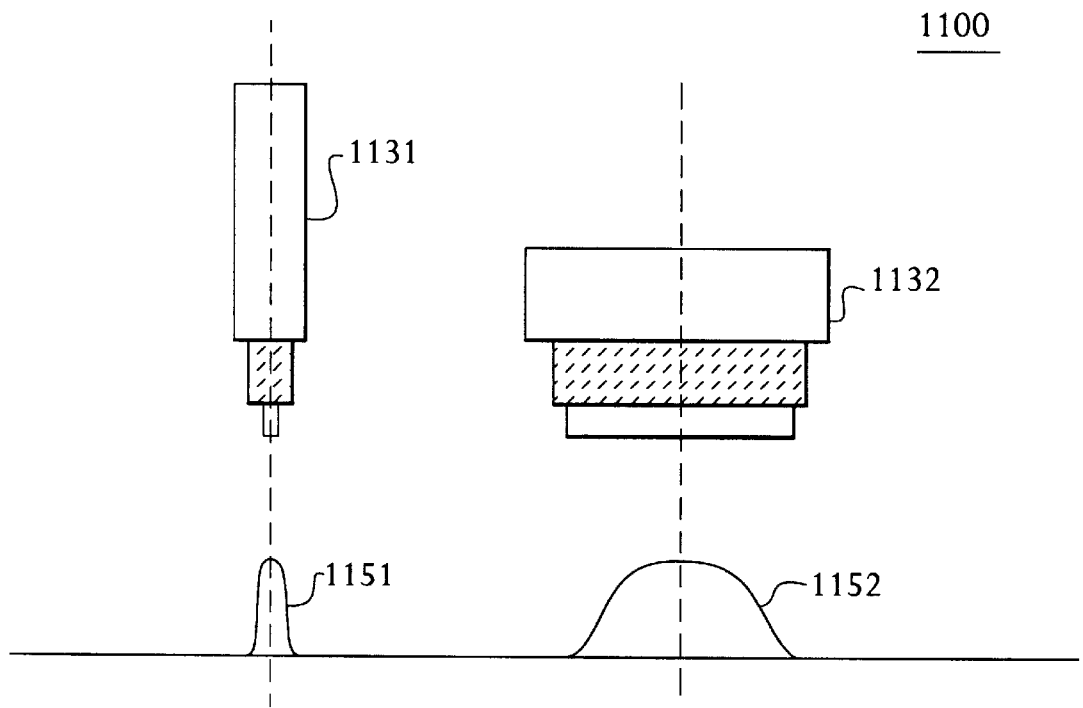
FIG. 11 illustrates two different diameter styli for both pen stylus and eraser stylus, and their corresponding Gausian beam widths, to illustrate the operation of a stylus diameter measurement component of the data capture system of FIGS. 8 and 9.

In this embodiment, stylus 930 has a uniform (non-coded) reflective band wrapped around its circumference, for example near its base. Reflected light appears as a Gausian distributed wave front, as illustrated in FIG. 11. FIG. 11 illustrates two different diameter styli for both pen stylus 1131 and eraser stylus 1132, and their corresponding Gausian beam widths 1151 and 1152, to illustrate the operation of a stylus diameter measurement component of the data capture system of FIGS. 8 and 9. As will be appreciated, the width of the wave front (I 151 or 1152) depends upon the diameter of the stylus reflector. By knowing the coordinate position of the reflecting stylus and its beam width, the embedded microprocessor can calculate the diameter of the stylus. Because the beam width can decrease as the stylus moves further away from the IAD sensors, both the coordinate position and the beam width are used in calculating the representative diameter. Knowing the representative diameter instead of embedded bar codes on the stylus, the processor can then assign meaningful characteristics to the stylus such as color or function.

Those skilled in the art will understand that the present invention may also be modified to track stylus movement in a three-dimensional coordinate system. It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system for capturing coordinate path data from a stylus moving across a surface of arbitrary size and shape, characterized by:
   (a) first receiver means mountable to the surface for receiving a first light beam from the stylus, the first light beam having a first angle with respect to a two-dimensional coordinate system defined within the surface, the first receiver means having means for determining the first angle;
   (b) second receiver means mountable to the surface for receiving a second light beam from the stylus, the second light beam having a second angle with respect to the two-dimensional coordinate system, the second receiver means having means for determining the second angle, wherein the first and second receiver means respectively include first and second solid state incident angle detectors (IADs) mounted closely together in a common housing on a single corner of a rectangle within the two-dimensional coordinate system;
   (c) means for determining the position of the stylus given the first and second angles and the locations of the first and second receiver means in the two-dimensional coordinate system; and
   (d) means for determining a stylus characteristic.

2. The system of claim 1, further including a divergent light source incorporated within the common housing and for shining divergent light over the surface, wherein the stylus comprises means for reflecting the light from the divergent light source as the first and second light beams.

3. The system of claim 1, wherein means (c) is a processor capable of performing triangulation to determine the position of the stylus.

4. The system of claim 1, wherein means (c) includes means for determining the path of the stylus given a real-time sequence of determined stylus positions.

5. The system of claim 1, wherein the stylus includes means for emitting a plurality of divergent cones of light comprising the first and second light beams.

6. The system of claim 5, wherein the stylus includes a pressure sensitive tip for activating or deactivating the first and second light beams in accordance with pressure applied to the stylus.

7. The system of claim 5, wherein the light beams are infrared (IR) radiation.

8. The system of claim 1, further comprising at least one divergent light source for shining at least one divergent beam of light over the surface, wherein the stylus includes means for reflecting the light from the divergent light source as the first and second light beams.

9. The system of claim 2, wherein the divergent light source includes one of light-emitting diodes and solid state laser diodes.

10. The system of claim 1, wherein the first and second receiver means each include:
    a light detection amplifier having a gain; and
    an automatic gain control (AGC) sensor circuit for sensing the amplitude of the light detected by the respective receiver means and for adjusting the gain of the light detection amplifier in accordance with the amplitude sensed.

11. The system of claim 1, wherein the means for determining a stylus characteristic includes a pulse code modulated (PCM) frequency generator in the stylus that generates a unique stylus characteristic code and a means for sensing and interpreting the code.

12. The system of claim 1, wherein the means for determining a stylus characteristic includes means for determining the diameter of the stylus.

13. A system for capturing coordinate path data from a stylus moving across a surface of arbitrary size and shape, characterized by:
    (a) a first solid state incident angle detector (IAD) comprising two adjacent photodiode elements and mounted in a common housing mountable at a corner of a rectangle within a two-dimensional coordinate system defined within the surface, wherein the first IAD is for receiving a first light beam from the stylus, the first light beam having a first angle with respect to the two-dimensional coordinate system, the first IAD comprising means for determining the first angle based upon the ratio of light from the first light beam falling on the two adjacent photodiode elements of the first IAD;
    (b) a second IAD comprising two adjacent photodiode elements, wherein the second IAD is mounted in the common housing and separated from the first IAD by a known, fixed distance, wherein the second IAD is for receiving a second light beam from the stylus, the second light beam having a second angle with respect to the two-dimensional coordinate system, the second IAD comprising means for determining the second angle based upon the ratio of light from the second light beam falling on the two adjacent photodiode elements of the second IAD; and
    (c) means for determining the position of the stylus given the first and second angles and the locations of the first and second receiver means in the two-dimensional coordinate system.

14. The system of claim 13, further including a divergent light source incorporated within the common housing and for shining divergent light over the surface, wherein the stylus comprises means for reflecting the divergent light from the divergent light source as the first and second light beams.

15. The system of claim 14, wherein the divergent light source includes one of light-emitting diodes and solid state laser diodes.

16. The system of claim 13, wherein means (c) is a processor capable of performing triangulation to determine the position of the stylus.

17. The system of claim 13, wherein means (c) includes means for determining the path of the stylus given a real-time sequence of determined stylus positions.

18. The system of claim 13, further comprising:
    (d) means for determining a stylus characteristic.

19. The system of claim 18, wherein the means for determining the stylus characteristic includes means for determining the diameter of the stylus.

20. The system of claim 1, wherein each of the first and second IADs comprises two adjacent photodiode elements and means for determining the respective first or second angle based upon the ratio of light from the respective first or second light beam falling on the two adjacent photodiode elements of said each IAD.

* * * * *